US011245327B2

(12) United States Patent
Feng et al.

(10) Patent No.: US 11,245,327 B2
(45) Date of Patent: Feb. 8, 2022

(54) CIRCUIT FOR DRIVING SYNCHRONOUS RECTIFIER DEVICE WITH FALSE TURN ON PREVENTION

(71) Applicant: Chengdu Monolithic Power Systems Co., Ltd., Chengdu (CN)

(72) Inventors: Lin Feng, Chengdu (CN); Yuedong Chen, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 21 days.

(21) Appl. No.: 16/851,057

(22) Filed: Apr. 16, 2020

(65) Prior Publication Data

US 2020/0389082 A1 Dec. 10, 2020

(30) Foreign Application Priority Data

Jun. 4, 2019 (CN) .......................... 201910482738.9

(51) Int. Cl.
*H02M 1/36* (2007.01)
*H02M 1/08* (2006.01)
*H02M 3/335* (2006.01)
*H02M 1/00* (2006.01)

(52) U.S. Cl.
CPC .............. *H02M 1/36* (2013.01); *H02M 1/08* (2013.01); *H02M 3/33592* (2013.01); *H02M 1/0045* (2021.05)

(58) Field of Classification Search
CPC ............... H02M 7/217; H02M 1/0006; H02M 2001/0006; H02M 3/33592; H02M 3/33576; H02M 1/36
See application file for complete search history.

(56) References Cited

U.S. PATENT DOCUMENTS

| 9,979,309 | B1* | 5/2018 | Green | H02M 3/33592 |
| 10,224,828 | B1* | 3/2019 | Sigamani | H02M 3/33507 |
| 2003/0048643 | A1* | 3/2003 | Lin | H02M 3/33592 363/21.06 |
| 2003/0081433 | A1* | 5/2003 | Itakura | H02M 3/33592 363/21.06 |
| 2007/0081371 | A1* | 4/2007 | Wittenbreder | H03K 17/04 363/127 |
| 2014/0268915 | A1* | 9/2014 | Kong | H02M 3/33592 363/21.14 |
| 2016/0065203 | A1* | 3/2016 | Zojer | H02M 1/088 327/109 |

(Continued)

*Primary Examiner* — Gustavo A Rosario-Benitez
(74) *Attorney, Agent, or Firm* — Perkins Coie LLP (57) ABSTRACT

A driving circuit for driving a synchronous rectifier device. The driving circuit may include a controllable clamping circuit having a first terminal coupled to a sensing terminal of the driving circuit, a second terminal coupled to a reference ground terminal of the driving circuit, a third terminal coupled to a driving terminal of the driving circuit, and a control terminal configured to receive a supply indication signal indicative of a voltage potential at a supply terminal of the driving circuit. The third terminal of the controllable clamping circuit may be connected to the second terminal of the controllable clamping circuit when the supply indication signal indicates that the voltage potential at the supply terminal has not been established to maintain the synchronous rectifier device off.

19 Claims, 9 Drawing Sheets

(56) References Cited

U.S. PATENT DOCUMENTS

| | | | |
|---|---|---|---|
| 2016/0105122 A1* | 4/2016 | Gong | H02M 1/36 363/21.14 |
| 2017/0070151 A1* | 3/2017 | Lin | H02M 1/36 |
| 2017/0207715 A1* | 7/2017 | Lin | H02M 3/33592 |
| 2018/0062530 A1* | 3/2018 | Kong | H02M 1/08 |
| 2018/0212528 A1* | 7/2018 | Tang | H02M 3/33592 |
| 2019/0097521 A1* | 3/2019 | Tao | H02M 7/217 |
| 2021/0057987 A1* | 2/2021 | Chen | H02M 1/36 |
| 2021/0175790 A1* | 6/2021 | Ye | H02M 1/08 |

* cited by examiner

CIRCUIT FOR DRIVING SYNCHRONOUS RECTIFIER DEVICE WITH FALSE TURN ON PREVENTION

CROSS-REFERENCE TO RELATED APPLICATION(S)

This application claims the benefit of CN application No. 201910482738.9 filed on Jun. 4, 2019 and incorporated herein by reference.

TECHNICAL FIELD

This disclosure relates generally to electrical circuit, and more particularly but not exclusively relates to circuit for driving synchronous rectifier device.

BACKGROUND

Synchronous rectifier devices are widely used in various applications, for instance, configured as switching device at secondary side of isolated converters e.g. LLC resonant converter and flyback converter etc. At startup or power on of an isolated converter, when the switching device at its primary side is turned on to enable a current flowing through the primary winding of the isolated converter, an abrupt increase in a voltage drop on the synchronous rectifier device at the secondary side may be induced. For example, if a metal oxide semiconductor field effect transistor ("MOSFET") is used as the synchronous rectifier device, an abrupt increase in a drain to source voltage of the MOSFET may be induced due to turn on of the switching device at the primary side. For this situation, since at startup power supply has normally not yet been established to a high enough voltage level to power a driving circuit which is used to drive a control terminal of the synchronous rectifier device to control on and off switching of the synchronous rectifier device, a very large resistance (e.g. possibly up to several million ohms) presents at the control terminal, resulting in the control terminal of the synchronous rectifier device vulnerable to noise coupling that may falsely turn on the synchronous rectifier device. False turn on of the synchronous rectifier device during the switching device at the primary side is on may cause undesired startup failure of the isolated converter and even severe damage of circuit elements in the isolated converter etc.

SUMMARY

In accomplishing the above and other objects, there has been provided, in accordance with an embodiment of the present invention, a driving circuit for driving a synchronous rectifier device. The driving circuit may comprise a controllable clamping circuit having a first terminal coupled to a sensing terminal of the driving circuit, a second terminal coupled to a reference ground terminal of the driving circuit, a third terminal coupled to a driving terminal of the driving circuit, and a control terminal configured to receive a supply indication signal indicative of a voltage potential at a supply terminal of the driving circuit. The controllable clamping circuit may be configured to connect the third terminal of the controllable clamping circuit to the second terminal of the controllable clamping circuit when the supply indication signal indicates that the voltage potential at the supply terminal has not been established.

The controllable clamping circuit may further be configured to disconnect the third terminal of the controllable clamping circuit from the second terminal of the controllable clamping circuit when the supply indication signal indicates that the voltage potential at the supply terminal has been established.

In accordance with an embodiment, the sensing terminal of the driving circuit may be coupled to a first terminal of the synchronous rectifier device, the reference ground terminal of the driving circuit may be coupled to a second terminal of the synchronous rectifier device, and the driving terminal of the driving circuit may be coupled to a control terminal of the synchronous rectifier device.

In accordance with an embodiment, the controllable clamping circuit may further comprise a controllable voltage regulation module and a controllable clamping switch. The controllable voltage regulation module may be configured to receive the supply indication signal at a control terminal of the controllable voltage regulation module, and further configured to convert a voltage potential at the first terminal of the controllable clamping circuit to a predetermined voltage, wherein when the supply indication signal indicates that the voltage potential at the supply terminal has not been established, the controllable voltage regulation module may further be configured to provide the predetermined voltage at an output terminal of the controllable voltage regulation module, and wherein when the supply indication signal indicates that the voltage potential at the supply terminal has been established, the controllable voltage regulation module is further configured to stop providing the predetermined voltage to the output terminal of the controllable voltage regulation module. The controllable clamping switch may have a first terminal coupled to the second terminal of the controllable clamping circuit, a second terminal coupled to the third terminal of the controllable clamping circuit, and a control terminal coupled to the output terminal of the controllable voltage regulation module, wherein the predetermined voltage is higher than a turn-on threshold of the controllable clamping switch.

In accordance with an embodiment, the controllable clamping switch further comprises a switch device of a low rated operating voltage and of a low turn-on threshold.

In accordance with an embodiment, the controllable voltage regulation module may comprise: a controllable linear voltage regulator, having an input terminal coupled to the first terminal of the controllable clamping circuit, an output terminal coupled to the control terminal of the controllable clamping switch, and a control terminal configured to receive the supply indication signal. The controllable linear voltage regulator may be configured to convert the voltage potential at its first terminal to the predetermined voltage. The controllable linear voltage regulator may further be configured to provide the predetermined voltage to its output terminal when the supply indication signal indicates that the voltage potential at the supply terminal has not been established. The controllable linear voltage regulator may further be configured to stop providing the predetermined voltage to its output terminal when the supply indication signal indicates that the voltage potential at the supply terminal has been established.

In accordance with an embodiment, the controllable voltage regulation module may comprise a controllable current source structure and a controllable energy storage structure. The controllable current source structure may have a supply input terminal coupled to the first terminal of the controllable clamping circuit, a control terminal configured to receive the supply indication signal, and an output terminal, wherein when an output voltage potential at the output terminal of the controllable current source structure is lower than the predetermined voltage and the supply indication signal indicates that the voltage potential at the supply terminal has not been established, the controllable current source structure may be configured to provide a current to its output terminal, and wherein when an output voltage potential at the output terminal of the controllable current source structure reaches the predetermined voltage or the supply indication signal indicates that the voltage potential at the supply terminal has been established, the controllable current source structure may further be configured to stop providing the current to its output terminal. The controllable energy storage structure may have a first terminal coupled to the output terminal of the controllable current source structure, a second terminal coupled to the second terminal of the controllable clamping circuit, and a control terminal configured to receive the supply indication signal, wherein when the supply indication signal indicates that the voltage potential at the supply terminal has not been established, the controllable energy storage structure may be configured to receive the current from the controllable current source structure and store energy to provide the predetermined voltage at the first terminal of the controllable energy storage structure, and wherein when the supply indication signal indicates that the voltage potential at the supply terminal has been established, the controllable energy storage structure may further be configured to release energy.

In accordance with an embodiment, the controllable current source structure may further comprise: a single direction conductive device, having a first terminal coupled to the supply input terminal of the controllable current source structure, and a second terminal, wherein the single direction conductive device is conductive from the first terminal to the second terminal and is reversely blocked from the second terminal to the first terminal; a first controllable switching device, having a control terminal, a first terminal coupled to the second terminal of the single direction conductive device, and a second terminal coupled to the output terminal of the controllable current source structure; a second controllable switching device, having a control terminal configured to receive the supply indication signal, a first terminal coupled to the control terminal of the first controllable switching device, and a second terminal coupled to the second terminal of the controllable clamping circuit; a resistive device, having a first terminal coupled to the supply input terminal of the controllable current source structure, and a second terminal coupled to the control terminal of the first controllable switching device; and a voltage stabilizer, coupled between the control terminal of the first controllable switching device and the second terminal of the controllable clamping circuit, and is configured to stabilize a voltage at the control terminal of the first controllable switching device at a preset voltage value.

In accordance with an embodiment, the second controllable switching device may be turned off when the supply indication signal indicates that the voltage potential at the supply terminal has not been established, and wherein the second controllable switching device is turned on when the supply indication signal indicates that the voltage potential at the supply terminal has been established.

In accordance with an embodiment, the controllable energy storage structure may further comprise: a capacitive energy storage device, having a first terminal coupled to the output terminal of the controllable current source structure, and a second terminal coupled to the second terminal of the controllable clamping circuit; and an energy storage control switch, having a first terminal coupled to the output terminal of the controllable current source structure, a second terminal coupled to the second terminal of the controllable clamping circuit, and a control terminal configured to receive the supply indication signal.

In accordance with an embodiment, the energy storage control switch may be turned off when the supply indication signal indicates that the voltage potential at the supply terminal has not been established, and wherein the energy storage control switch is turned on when the supply indication signal indicates that the voltage potential at the supply terminal has been established.

In accordance with an embodiment, the driving circuit may further comprise: a high-voltage sustain module, coupled between the first terminal of the synchronous rectifier device and the first terminal of the controllable clamping circuit, and configured to clamp a voltage potential at an output terminal of the high-voltage sustain module at a designed safe voltage.

In accordance with an embodiment, the high-voltage sustain module has a breakdown voltage higher than a maximum voltage potential value of the voltage potential at the first terminal of the synchronous rectifier device, and wherein the designed safe voltage is lower than a breakdown voltage of the controllable clamping circuit.

In accordance with an embodiment, the high-voltage sustain module may comprise: a high-voltage junction field effect transistor, having a drain terminal coupled to the first terminal of the synchronous rectifier device, a source terminal coupled to the first terminal of the controllable clamping circuit, and a gate terminal coupled to the second terminal of the synchronous rectifier device.

In accordance with an embodiment, the high-voltage sustain module may comprise: a metal oxide semiconductor field effect transistor ("MOSFET") having a drain terminal coupled to the first terminal of the synchronous rectifier device, a source terminal coupled to the first terminal of the controllable clamping circuit, and a gate terminal; a resistor having a first terminal coupled to the first terminal of the synchronous rectifier, and a second terminal; a diode, having an anode coupled to the second terminal of the resistor and a cathode coupled to the gate terminal of the MOSFET; and a capacitor and a Zener diode coupled in parallel between the gate terminal of the MOSFET and the second terminal of the synchronous rectifier.

In accordance with an embodiment, the high-voltage sustain module may comprise a voltage regulator.

In accordance with an embodiment, the driving circuit may further comprise: a voltage regulation circuit, coupled to the supply terminal of the driving circuit and configured to convert the voltage potential at the supply terminal into a power supply potential.

In accordance with an embodiment, the driving circuit may further comprise: a logic control circuit, configured to provide a control signal for controlling on and off switching of the synchronous rectifier device.

In accordance with an embodiment, the driving circuit may further comprise: a driver, configured to enhance a driving capacity of the control signal to provide a driving signal to the driving terminal of the driving circuit.

In accordance with an embodiment, the voltage potential at the supply terminal needs a startup procedure to be charged up to a predetermined supply voltage value.

BRIEF DESCRIPTION OF THE DRAWINGS

The following detailed description of various embodiments of the present invention can best be understood when read in conjunction with the following drawings, in which the features are not necessarily drawn to scale but rather are drawn as to best illustrate the pertinent features.

DETAILED DESCRIPTION

Various embodiments of the present invention will now be described. In the following description, some specific details, such as example circuits and example values for these circuit components, are included to provide a thorough understanding of the embodiments. One skilled in the relevant art will recognize, however, that the present invention can be practiced without one or more specific details, or with other methods, components, materials, etc. In other instances, well-known structures, materials, processes or operations are not shown or described in detail to avoid obscuring aspects of the present invention.

Throughout the specification and claims, the term "coupled," as used herein, is defined as directly or indirectly connected in an electrical or non-electrical manner. The terms "a," "an," and "the" include plural reference, and the term "in" includes "in" and "on". The phrase "in one embodiment," as used herein does not necessarily refer to the same embodiment, although it may. The term "or" is an inclusive "or" operator, and is equivalent to the term "and/or" herein, unless the context clearly dictates otherwise. The term "based on" is not exclusive and allows for being based on additional factors not described, unless the context clearly dictates otherwise. The term "circuit" means at least either a single component or a multiplicity of components, either active and/or passive, that are coupled together to provide a desired function. The term "signal" means at least one current, voltage, charge, temperature, data, or other signal. Where either a field effect transistor ("FET") or a bipolar junction transistor ("BJT") may be employed as an embodiment of a transistor, the scope of the words "gate", "drain", and "source" includes "base", "collector", and "emitter", respectively, and vice versa. Those skilled in the art should understand that the meanings of the terms identified above do not necessarily limit the terms, but merely provide illustrative examples for the terms.

Figure 1:
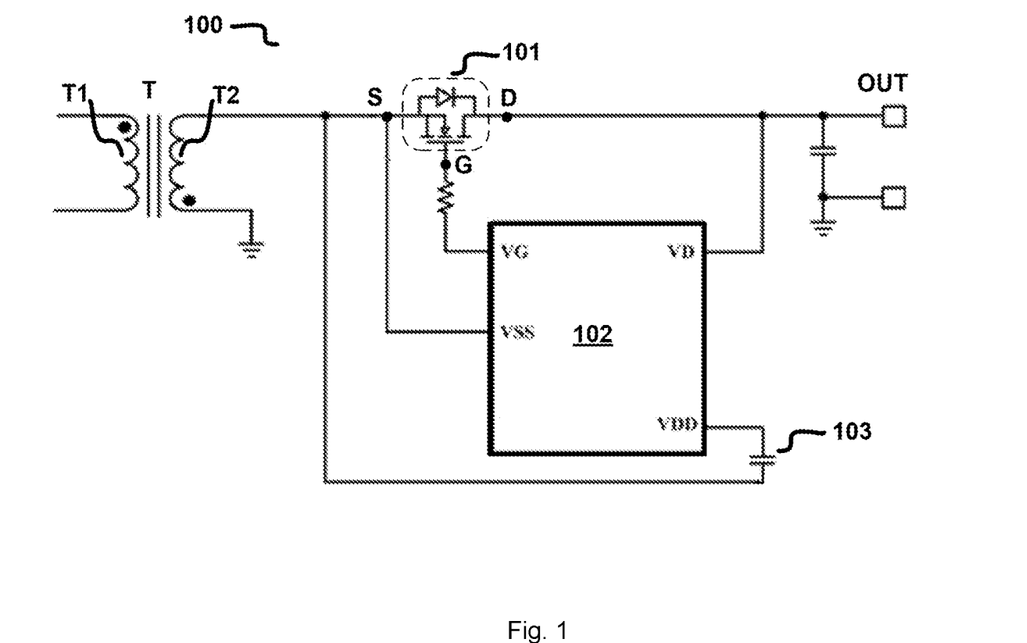
FIG. 1 illustrates a block diagram of a synchronous rectifying circuit 100 in accordance with an embodiment of the present invention.

FIG. 1 illustrates a block diagram of a synchronous rectifying circuit 100 in accordance with an embodiment of the present invention. The synchronous rectifying circuit 100 may comprise a synchronous rectifier device 101 and a driving circuit 102. The synchronous rectifier device 101 may be configured as a switching device at a secondary side of an isolated converter. For instance, in the example of FIG. 1, the synchronous rectifier device 101 may be controlled by the driving circuit 102. The driving circuit 102 may have a sensing terminal VD coupled to an output terminal OUT of the isolated converter, a reference ground terminal VSS coupled to a secondary winding T2 of a transformer T of the isolated converter, and a supply terminal VDD coupled to the reference ground terminal VSS via a capacitive power storage device 103. In practical application, a voltage potential (also labeled with VSS) at the reference ground terminal VSS may be used as a reference ground potential VSS of the driving circuit 102 (including all the sub-circuits and elements that the driving circuit 102 may comprise). A first terminal D of the synchronous rectifier device 101 may be coupled to the sensing terminal VD of the driving circuit 102. A second terminal S of the synchronous rectifier device 101 may be coupled to the reference ground terminal VSS of the driving circuit 102. A control terminal G of the synchronous rectifier device 101 may be coupled to a driving terminal VG of the driving circuit 102. The synchronous rectifier device 101 may provide a current path from the first terminal D to the second terminal S when turned on and may switch the current path off when turned off.

Figure 2:
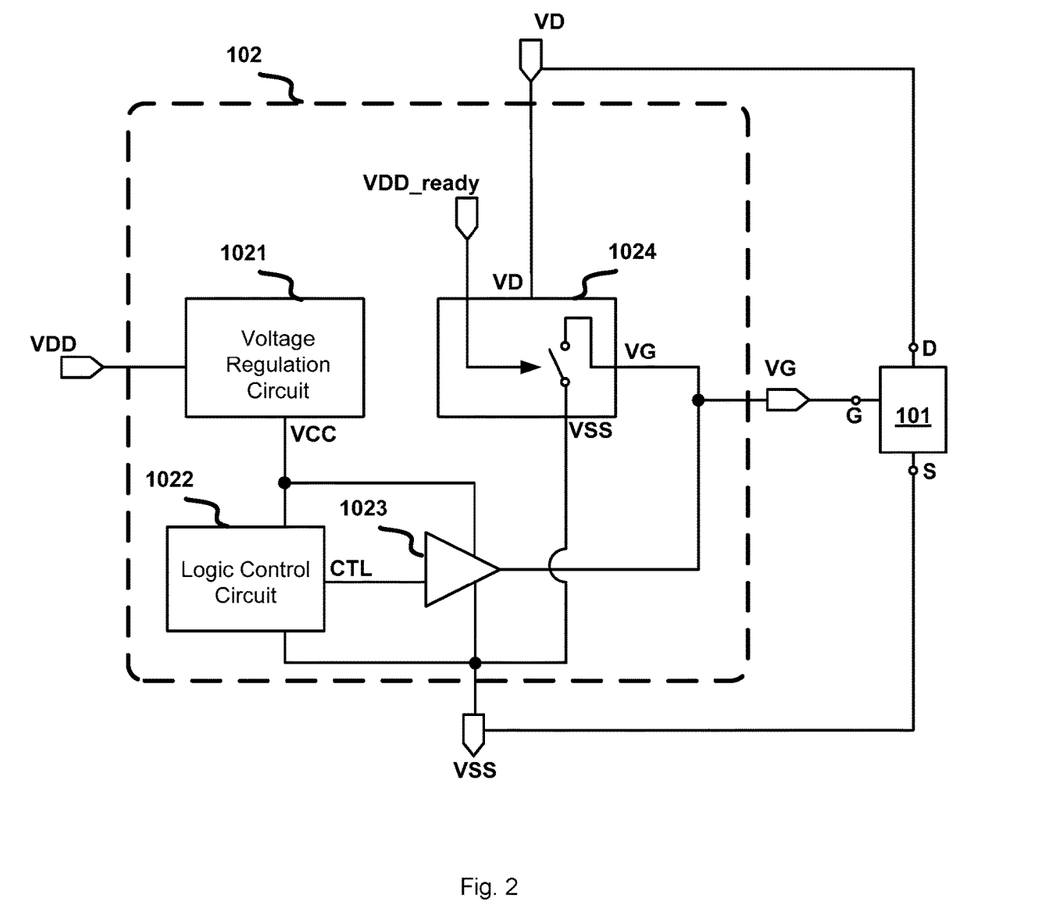
FIG. 2 illustrates a schematic diagram of the driving circuit 102 in accordance with an embodiment of the present invention.

FIG. 2 illustrates a schematic diagram of the driving circuit 102 in accordance with an embodiment of the present invention. The driving circuit 102 may comprise a voltage regulation circuit 1021, a logic control circuit 1022 and a driver 1023. The voltage regulation circuit 1021 may be coupled to the supply terminal VDD and may be configured to convert a voltage potential (also referenced by VDD for simplicity) at the supply terminal VDD into a power supply potential VCC (e.g. 5V or 3.3V or other suitable potential values) to power the logic control circuit 1022 and the driver 1023 for example. The logic control circuit 1022 may be configured to provide a control signal CTL for controlling on and off switching of the synchronous rectifier device 101. The driver 1023 may be configured to enhance the driving capacity of the control signal CTL to provide a driving signal (also labeled with VG) to the driving terminal VG. However, at startup or power on of the synchronous rectifying circuit 100, the voltage potential VDD at the supply terminal VDD generally needs a startup procedure (a startup time) to be established/charged up to a predetermined supply voltage value (e.g. 9V or 12V or other suitable voltage values required by practical applications). Therefore, the supply terminal VDD may not be able to power the voltage regulation circuit 1021 to provide the power supply potential VCC to the logic control circuit 1022 and the driver 1023 during the startup procedure. Consequently, the logic control circuit 1022 and the driver 1023 may not be able to provide the driving signal VG with enough driving capacity to correctly control the on and off switching of the synchronous rectifier device 101. For this situation, false turn on of the synchronous rectifier device 101 as described in the background section may occur.

The startup procedure begins at the moment when the synchronous rectifying circuit 100 is powered on and ends when the voltage potential VDD at the supply terminal VDD reaches the predetermined supply voltage value.

In accordance with an embodiment of the present invention, the driving circuit 102 may further comprise a controllable clamping circuit 1024. The controllable clamping circuit 1024 may have a first terminal (also labeled with VD) coupled to the sensing terminal VD of the driving circuit 102, a second terminal (also labeled with VSS) coupled to the reference ground terminal VSS, a third terminal (also labeled with VG) coupled to the driving terminal VG of the driving circuit 102, and a clamping control terminal configured to receive a supply indication signal VDD_ready indicative of the voltage potential VDD at the supply terminal VDD. The supply indication signal VDD_ready may be configured to indicate whether the voltage potential VDD at the supply terminal VDD has been established. One of ordinary skill in the art would understand that the voltage potential VDD at the supply terminal VDD has been established may refer to that the voltage potential VDD at the supply terminal VDD has been built up (or charged up) e.g. to reach a predetermined supply voltage value (for instance 9V or 12V). In contrast, the voltage potential VDD at the supply terminal VDD has not been established may refer to that the voltage potential VDD at the supply terminal VDD is lower than the predetermined supply voltage value (for instance 9V or 12V). The controllable clamping circuit 1024 may be configured to connect the third terminal VG of the controllable clamping circuit 1024 to the second terminal VSS of the controllable clamping circuit 1024 when the supply indication signal VDD_ready indicates that the voltage potential VDD at the supply terminal VDD has not been established so that in practical application the control terminal G of the synchronous rectifier device 101 (which is coupled to the driving terminal VG) is connected to the second terminal S of the synchronous rectifier device 101 (which is coupled to the reference ground terminal VSS) when the supply indication signal VDD_ready indicates that the voltage potential VDD at the supply terminal VDD has not been established. One of ordinary skill in the art should understand that the third terminal VG of the controllable clamping circuit 1024 "connected to" the second terminal VSS of the controllable clamping circuit 1024 here means that a current conduction path has been provided from the third terminal VG to the second terminal VSS or ideally the third terminal VG is shorted to the second terminal VSS. In this fashion, when the supply indication signal VDD_ready indicates that the voltage potential VDD at the supply terminal VDD has not been established, the potential VG at the control terminal G of the synchronous rectifier device 101 can be substantially clamped by the controllable clamping circuit 1024 at the potential VSS at the second terminal S of the synchronous rectifier device 101. That is to say, when the supply indication signal VDD_ready indicates that the voltage potential VDD at the supply terminal VDD has not been established, the potential VG at the control terminal G of the synchronous rectifier device 101 can be substantially clamped to be equal to the potential VSS at the second terminal S of the synchronous rectifier device 101 (i.e. the reference ground potential VSS) so that the synchronous rectifier device 101 is maintained off, preventing the synchronous rectifier device 101 from being falsely turned on due to noise coupling to the control terminal G. The controllable clamping circuit 1024 may further be configured to disconnect the third terminal VG of the controllable clamping circuit 1024 from the second terminal VSS of the controllable clamping circuit 1024 when the supply indication signal VDD_ready indicates that the voltage potential VDD at the supply terminal VDD has been established so that the potential VG at the control terminal G of the synchronous rectifier device 101 is no longer be clamped.

Figure 3:
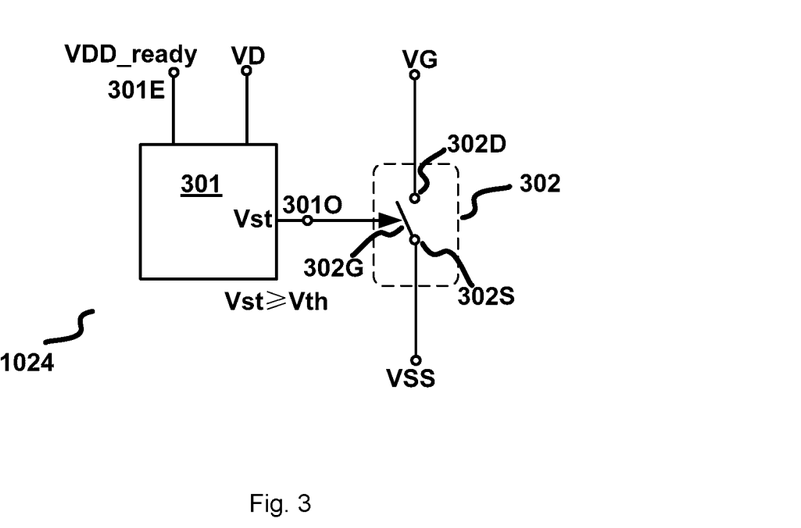
FIG. 3 illustrates a schematic diagram of the controllable clamping circuit 1024 in accordance with an embodiment of the present invention.

FIG. 3 illustrates a schematic diagram of the controllable clamping circuit 1024 in accordance with an embodiment of the present invention. The controllable clamping circuit 1024 may comprise a controllable voltage regulation module 301 and a controllable clamping switch 302. The controllable voltage regulation module 301 may be configured to convert the voltage potential VD at the first terminal VD of the controllable clamping circuit 1024 to a predetermined voltage Vst. The controllable voltage regulation module 301 may be configured to receive the supply indication signal VDD_ready at a control terminal 301E of the controllable voltage regulation module 301. The controllable voltage regulation module 301 may further be configured to provide the predetermined voltage Vst at an output terminal 301O of the controllable voltage regulation module 301 when the supply indication signal VDD_ready indicates that the voltage potential VDD at the supply terminal VDD has not been established. The controllable voltage regulation module 301 may further be configured to stop providing the predetermined voltage Vst to the output terminal 301O when the supply indication signal VDD_ready indicates that the voltage potential VDD at the supply terminal VDD has been established. The controllable clamping switch 302 may have a first terminal 302S coupled to the second terminal VSS of the controllable clamping circuit 1024, a second terminal 302D coupled to the third terminal VG of the controllable clamping circuit 1024, and a control terminal 302G coupled to the output terminal 301O of the controllable voltage regulation module 301. The predetermined voltage Vst is higher than a turn-on threshold Vth of the controllable clamping switch 302. When the supply indication signal VDD_ready indicates that the voltage potential VDD at the supply terminal VDD has not been established, the controllable voltage regulation module 301 provides the predetermined voltage Vst to the control terminal 302G of the controllable clamping switch 302 to keep the controllable clamping switch 302 on so that the third terminal VG of the controllable clamping circuit 1024 is connected to the second terminal VSS of the controllable clamping circuit 1024. When the supply indication signal VDD_ready indicates that the voltage potential VDD at the supply terminal VDD has been established, the controllable voltage regulation module 301 stops providing the predetermined voltage Vst to the control terminal 302G of the controllable clamping switch 302 to keep the controllable clamping switch 302 off so that the third terminal VG of the controllable clamping circuit 1024 is disconnected from the second terminal VSS of the controllable clamping circuit 1024. The controllable clamping switch 302 may comprise any suitable switch device of a low rated operating voltage (e.g. lower than 5V) and of a low turn-on threshold (e.g. lower than 0.3V) such that the controllable clamping switch 302 can perform high speed on and off switching.

Figure 4:
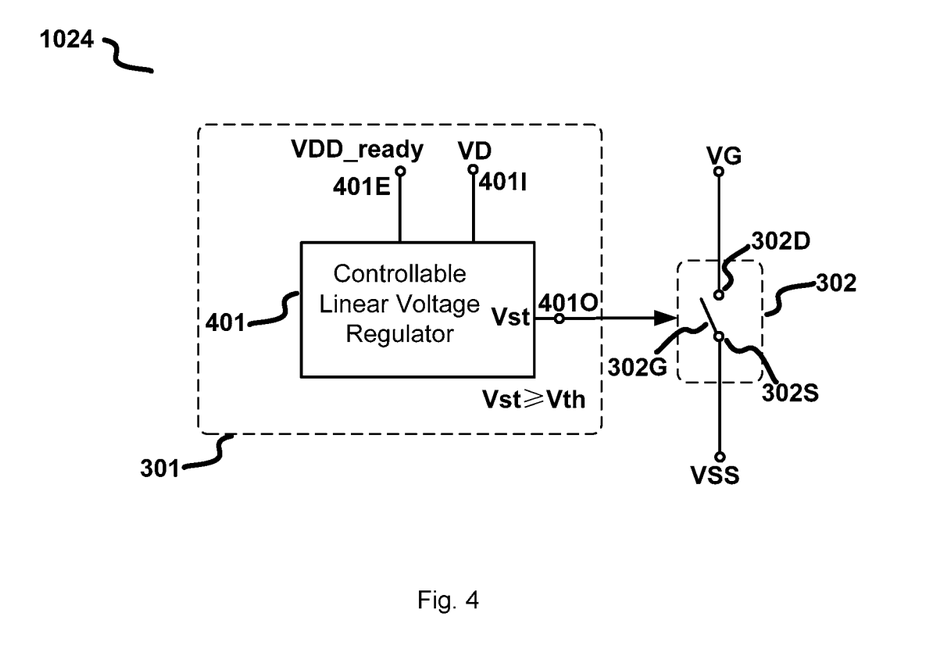
FIG. 4 illustrates a schematic diagram of the controllable clamping circuit 1024 in accordance with an alternative embodiment of the present invention.

In accordance with an embodiment of the present invention, as illustrated in FIG. 4, the controllable voltage regulation module 301 (Comment: I do not see this label in FIG. 4) may comprise a controllable linear voltage regulator 401 having an input terminal 4011, an output terminal 4010 and a control terminal 401E. The input terminal 4011 of the controllable linear voltage regulator 401 may be coupled to the first terminal VD of the controllable clamping circuit 1024 to detect/receive the voltage potential VD at the first terminal VD of the controllable clamping circuit 1024. The controllable linear voltage regulator 401 may be configured to convert the voltage potential VD (Comment: I do not see this in FIG. 4) at its first terminal VD to said predetermined voltage Vst. The control terminal 401E of the controllable linear voltage regulator 401 may be configured to receive the supply indication signal VDD_ready. The output terminal 401O of the controllable linear voltage regulator 401 may be coupled to the control terminal 302G of the controllable clamping switch 302. The controllable linear voltage regulator 401 may further be configured to provide the predetermined voltage Vst to its output terminal 401O when the supply indication signal VDD_ready indicates that the voltage potential VDD at the supply terminal VDD has not been established, and further be configured to stop providing the predetermined voltage Vst to its output terminal 401O when the supply indication signal VDD_ready indicates that the voltage potential VDD at the supply terminal VDD has been established.

Figure 5:
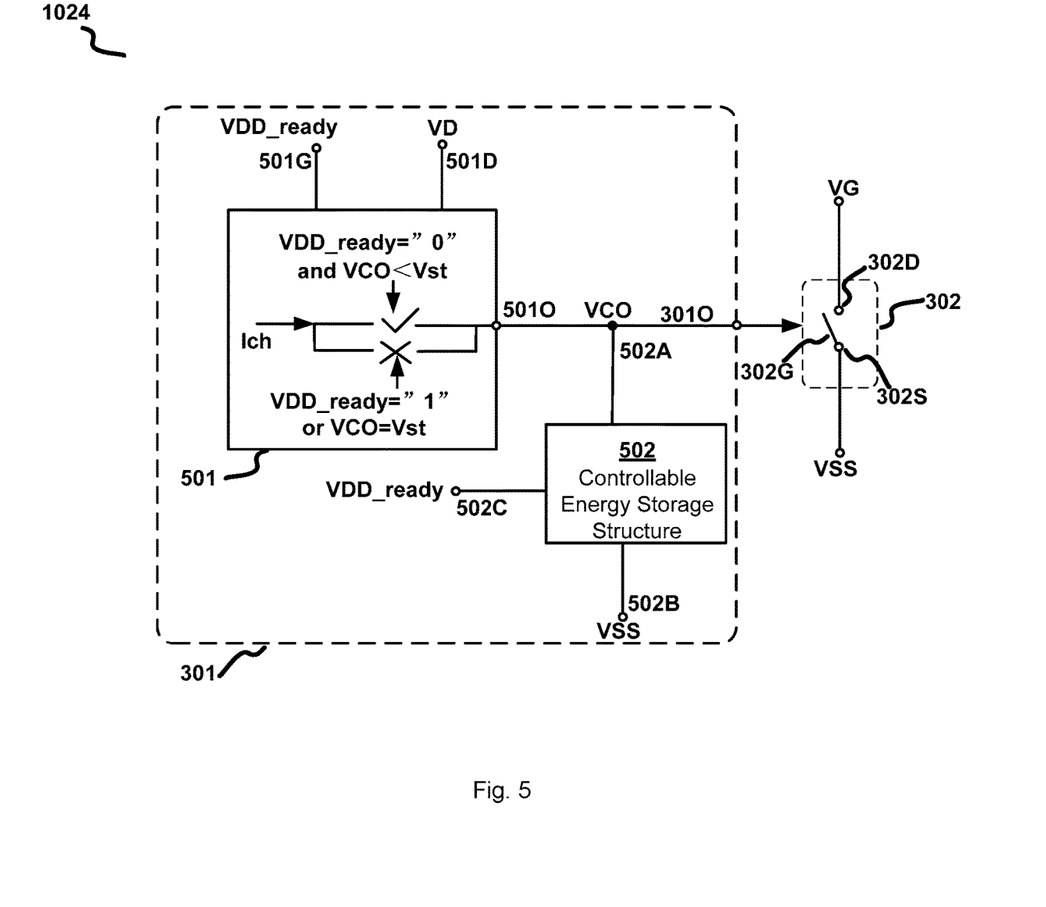
FIG. 5 illustrates a schematic diagram of the controllable clamping circuit 1024 in accordance with an alternative embodiment of the present invention.

In accordance with various embodiments of the present invention, the controllable voltage regulation module 301 may comprise any suitable voltage converting/regulating circuitry that may be controlled by the supply indication signal VDD_ready. For instance, in FIG. 5, a schematic diagram of the controllable voltage regulation module 301 in accordance with an alternative embodiment of the present invention is illustrated out. The controllable voltage regulation module 301 in FIG. 5 may comprise a controllable current source structure 501 and a controllable energy storage structure 502. The controllable current source structure 501 may have a supply input terminal 501D coupled to the first terminal VD of the controllable clamping circuit 1024 to detect/receive the voltage potential VD at the first terminal VD of the controllable clamping circuit 1024, a control terminal 501G configured to receive the supply indication signal VDD_ready, and an output terminal 501O coupled to a first terminal 502A of the controllable energy storage structure 502. A second terminal 502B of the controllable energy storage structure 502 may be coupled to the second terminal VSS of the controllable clamping circuit 1024. A control terminal 502C of the controllable energy storage structure 502 may be configured to receive the supply indication signal VDD_ready. When an output voltage potential VCO at the output terminal 501O of the controllable current source structure 501 is lower than the predetermined voltage Vst and the supply indication signal VDD_ready indicates that the voltage potential VDD at the supply terminal VDD has not been established, the controllable current source structure 501 may be configured to provide a current Ich to its output terminal 501O. For example, in FIG. 5, the supply indication signal VDD_ready is exemplarily illustrated to have a logic "low" (i.e. VDD_ready="0") indicating that the voltage potential VDD at the supply terminal VDD has not been established, and a "√" symbol is used to illustrate a current path of the current Ich flowing to the output terminal 501O of the controllable current source structure 501. When an output voltage potential VCO at the output terminal 501O of the controllable current source structure 501 reaches the predetermined voltage Vst or the supply indication signal VDD_ready indicates that the voltage potential VDD at the supply terminal VDD has been established, the controllable current source structure 501 may be configured to stop providing the current Ich to its output terminal 501O. For example in FIG. 5, the supply indication signal VDD_ready is exemplarily illustrated to have a logic "high" (i.e. VDD_ready="1") indicating that the voltage potential VDD at the supply terminal VDD has been established, and a "×" symbol is used to illustrate stop providing the current Ich to the output terminal 501O of the controllable current source structure 501. When the supply indication signal VDD_ready indicates that the voltage potential VDD at the supply terminal VDD has not been established, the controllable energy storage structure 502 may be configured to receive the current Ich from the controllable current source structure 501O and store energy to provide the predetermined voltage Vst at the first terminal 502A of the controllable energy storage structure 502. When the supply indication signal VDD_ready indicates that the voltage potential VDD at the supply terminal VDD has been established, the controllable energy storage structure 502 may be configured to release energy.

Figure 6:
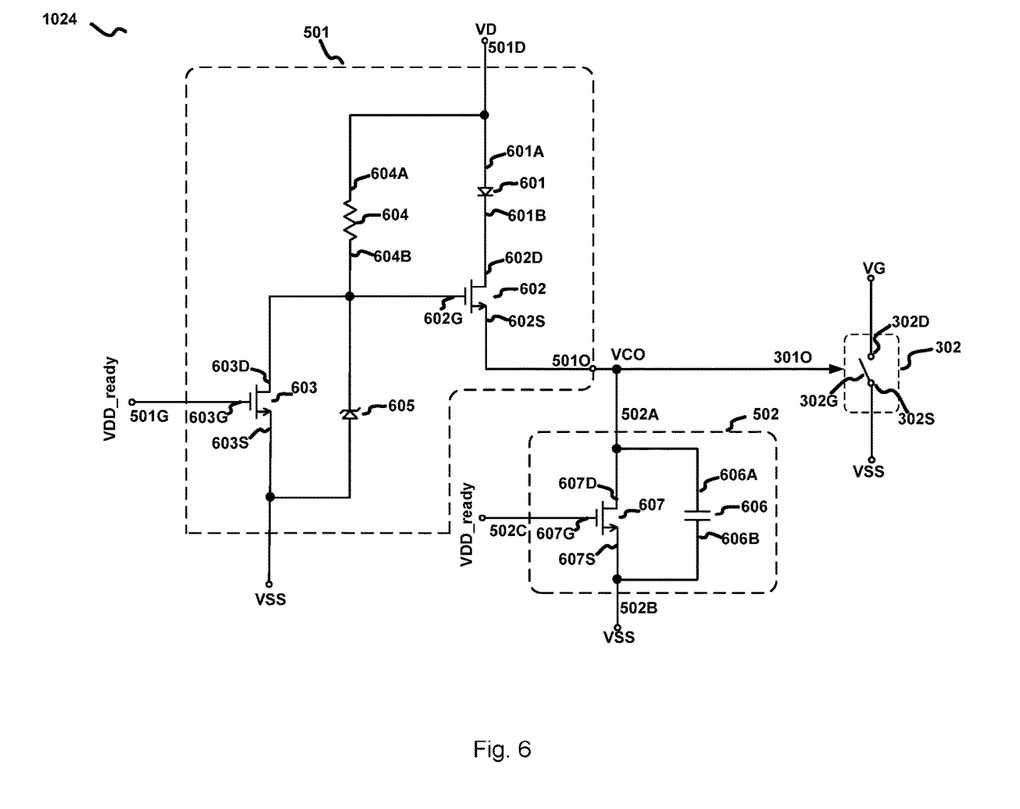
FIG. 6 illustrates a schematic diagram of the controllable clamping circuit 1024 in accordance with still an alternative embodiment of the present invention.

FIG. 6 illustrates a schematic diagram of the controllable voltage regulation module 301 in accordance with another alternative embodiment of the present invention. In FIG. 6, the controllable current source structure 501 may comprise a single direction conductive device 601 (e.g. illustrated as a diode in FIG. 6), a first controllable switching device 602 (e.g. illustrated as a first MOSFET in FIG. 6), a second controllable switching device 603 (e.g. illustrated as a second MOSFET in FIG. 6), a resistive device 604 and a voltage stabilizer 605. The single direction conductive device 601 may have a first terminal 601A coupled to the supply input terminal 501D of the controllable current source structure 501 (or to the first terminal VD of the controllable clamping circuit 1024), and a second terminal 601B coupled to a first terminal 602D of the first controllable switching device 602. The single direction conductive device 601 may be conductive from the first terminal 601A to the second terminal 601B and may be reversely blocked (nonconductive) from the second terminal 601B to the first terminal 601A. The single direction conductive device 601 is "conductive" in that it can provide a current path from the first terminal 601A to the second terminal 601B. The single direction conductive device 601 is "reversely blocked" in that it cannot provide a current path from the second terminal 601B to the first terminal 601A. A second terminal 602S of the first controllable switching device 602 may be coupled to the output terminal 501O of the controllable current source structure 501 (or to the first terminal 502A of the controllable energy storage structure 502). A control terminal 602G of the first controllable switching device 602 may be coupled to a first terminal 603D of the second controllable switching device 603. A second terminal 603S of the second controllable switching device 603 may be coupled to the second terminal VSS of the controllable clamping circuit 1024 and a control terminal 603G of the second controllable switching device 603 may be configured to receive the supply indication signal VDD_ready. The resistive device 604 may have a first terminal 604A coupled to the supply input terminal 501D of the controllable current source structure 501 (or to the first terminal VD of the controllable clamping circuit 1024), and a second terminal 604B coupled to the control terminal 602G of the first controllable switching device 602. The voltage stabilizer 605 may be coupled between the control terminal 602G of the first controllable switching device 602 and the second terminal VSS of the controllable clamping circuit 1024, and may be configured to stabilize the voltage at the control terminal 602G of the first controllable switching device 602 at a preset voltage value VSET. For instance, the preset voltage value VSET may be appropriately chosen to control the first controllable switching device 602 immediately be turned off when the output voltage potential VCO at the output terminal 501O of the controllable current source structure 501 reaches the predetermined voltage Vst. In the example of FIG. 6, the voltage stabilizer 605 is illustrated to comprise a Zener diode. However, those having ordinary skill in the art should understand that this is just illustrative and not intended to be limiting. The controllable energy storage structure 502 my comprise a capacitive energy storage device 606 and an energy storage control switch 607. The capacitive energy storage device 606 may have a first terminal 606A coupled to the output terminal 501O of the controllable current source structure 501, and a second terminal 606B coupled to the second terminal VSS of the controllable clamping circuit 1024. The energy storage control switch 607 may have a first terminal 607D coupled to the output terminal 501O of the controllable current source structure 501, a second terminal 607S coupled to the second terminal VSS of the controllable clamping circuit 1024, and a control terminal 607G configured to receive the supply indication signal VDD_ready.

For the exemplary controllable voltage regulation module 301 shown in FIG. 6, if the supply indication signal VDD_ready indicates that the voltage potential VDD at the supply terminal VDD has not been established, the second controllable switch 603 and the energy storage control switch 607 are off, when the voltage potential VD at the first terminal VD of the controllable clamping circuit 1024 is higher than the reference ground potential VSS at the second terminal VSS of the controllable clamping circuit 1024, the single direction conductive device 601 is conductive from the first terminal 601A to the second terminal 601B and the first controllable switch 602 is on to provide the current Ich. Meanwhile, the capacitive energy storage device 606 receives the current Ich and stores energy. Once the output voltage potential VCO at the output terminal 501O of the controllable current source structure 501 reaches the predetermined voltage Vst, the first controllable switch 602 is turned off immediately under the of the voltage stabilizer 605. Therefore, the output voltage potential VCO at the output terminal 501O of the controllable current source structure 501 can be maintained at the predetermined voltage Vst, which is applied to the control terminal 302G of the controllable clamping switch 302, keeping the controllable clamping switch 302 on. Consequently, the third terminal VG of the controllable clamping circuit 1024 is connected to the second terminal VSS of the controllable clamping circuit 1024, making the control terminal G of the synchronous rectifier device 101 connected to the second terminal S of the synchronous rectifier device 101 (i.e. the potential VG at the control terminal G of the synchronous rectifier device 101 is pulled down to the reference ground potential VSS at the second terminal S of the synchronous rectifier device 101) to keep the synchronous rectifier device 101 off. In this manner, when the supply indication signal VDD_ready indicates that the voltage potential VDD at the supply terminal VDD has not been established, the driving circuit 102 comprising the controllable clamping circuit 1024 according to various embodiments of the present invention can prevent the synchronous rectifier device 101 from being falsely turned on due to noise coupling. If the supply indication signal VDD_ready indicates that the voltage potential VDD at the supply terminal VDD has been established, the second controllable switch 603 is turned on and the first controllable switch 602 is turned off to stop proving the current Ich. Meanwhile, the energy storage control switch 607 is turned on to make the capacitive energy storage device 606 to release energy, resulting in the output voltage potential VCO at the output terminal 501O of the controllable current source structure 501 being pulled down to the reference ground potential VSS. Thus, the controllable clamping switch 302 is turned off, disconnecting the control terminal G of the synchronous rectifier device 101 from the second terminal S of the synchronous rectifier device 101 so that the synchronous rectifier device 101 can be controlled by the logic control circuit 1022 and the driver 1023.

Figure 7:
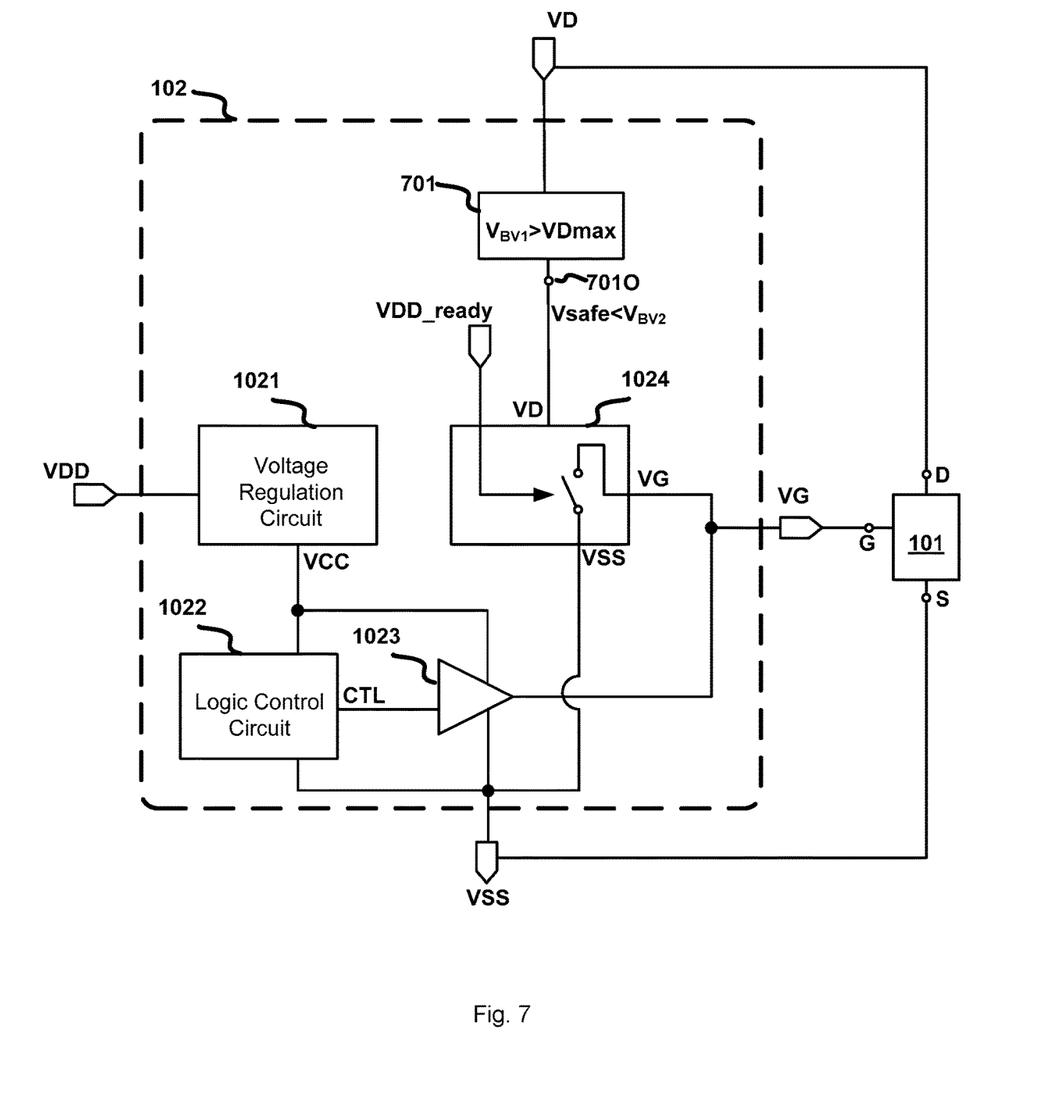
FIG. 7 illustrates a schematic diagram of the driving circuit 102 in accordance with an alternative embodiment of the present invention.

In accordance with an alternative embodiment of the present invention, as shown in FIG. 7, the driving circuit 102 may optionally further comprise a high-voltage sustain module 701. The high-voltage sustain module 701 may be coupled between the first terminal D of the synchronous rectifier device 101 and the first terminal VD of the controllable clamping circuit 1024. The high-voltage sustain module 701 may have a high break down voltage VBV1, e.g. at least higher than a maximum voltage potential value VDmax of the voltage potential VD at the first terminal VD of the synchronous rectifier device 101. Those having ordinary skill in the art would understand that the breakdown voltage VBV1 of the high-voltage sustain module 701 may refer to a minimum voltage that causes a device in the high-voltage sustain module 701 being electrically breakdown, i.e. a minimum voltage that causes a portion of an insulator in the device to become electrically conductive or causes a PN junction in the device to breakdown. The maximum potential value VDmax of the voltage potential VD at the first terminal VD of the synchronous rectifier device 101 may vary in different practical applications, but should be no higher than a breakdown voltage of the synchronous rectifier device 101. The breakdown voltage of the synchronous rectifier device 101 may refer to a minimum voltage that causes a portion of an insulator in the synchronous rectifier device 101 to become electrically conductive or causes a PN junction in the synchronous rectifier device 101 to breakdown. The high-voltage sustain module 701 may be configured to receive the voltage potential VD at the first terminal VD of the synchronous rectifier device 101 and to clamp a voltage potential at its output terminal 701O at a designed safe voltage Vsafe, e.g. the designed safe voltage Vsafe may be lower than a breakdown voltage VBV2 of the controllable clamping circuit 1024. Those having ordinary skill in the art would understand that the breakdown voltage VBV2 of the controllable clamping circuit 1024 may refer to a minimum voltage that causes a device in the controllable clamping circuit 1024 being electrically breakdown, i.e. a minimum voltage that causes a portion of an insulator in the device to become electrically conductive or causes a PN junction in the device to breakdown. The output terminal 701O of the high-voltage sustain module 701 is coupled to the first terminal VD of the controllable clamping circuit 1024. In certain high voltage applications, e.g. wherein the voltage potential VD at the first terminal VD of the synchronous rectifier device 101 may get higher than the breakdown voltage VBV2 of the controllable clamping circuit 1024, the high-voltage sustain module 701 may protect the controllable clamping circuit 1024 from being damaged.

Figure 8:
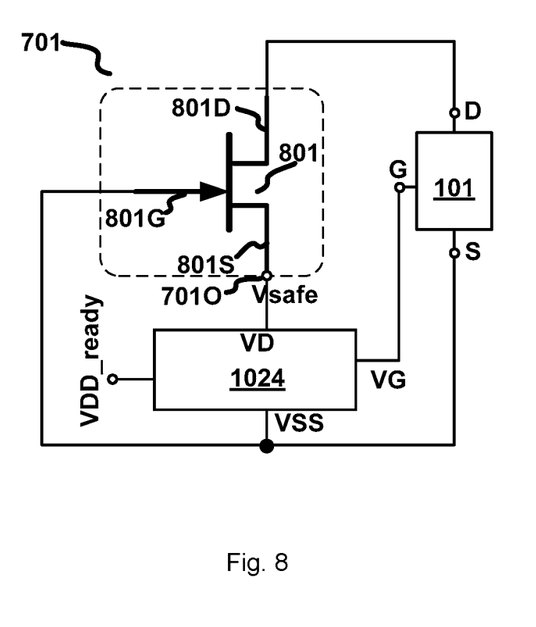
FIG. 8 illustrates a schematic diagram of the driving circuit 102 in accordance with an alternative embodiment of the present invention.

In an exemplary embodiment as shown in FIG. 8, the high-voltage sustain module 701 may comprise a high-voltage junction field effect transistor ("JFET") 801. In this exemplary embodiment, the breakdown voltage VBV1 of the high-voltage sustain module 701 may refer to the minimum voltage that causes a portion of an insulator in the high-voltage JFET 801 to become electrically conductive or causes a PN junction in the high-voltage JFET 801 to breakdown. The JFET 801 may have a drain terminal 801D coupled to the first terminal D of the synchronous rectifier device 101, a source terminal 801S coupled to the first terminal VD of the controllable clamping circuit 1024, and a gate terminal coupled to the second terminal S of the synchronous rectifier device 101.

Figure 9:
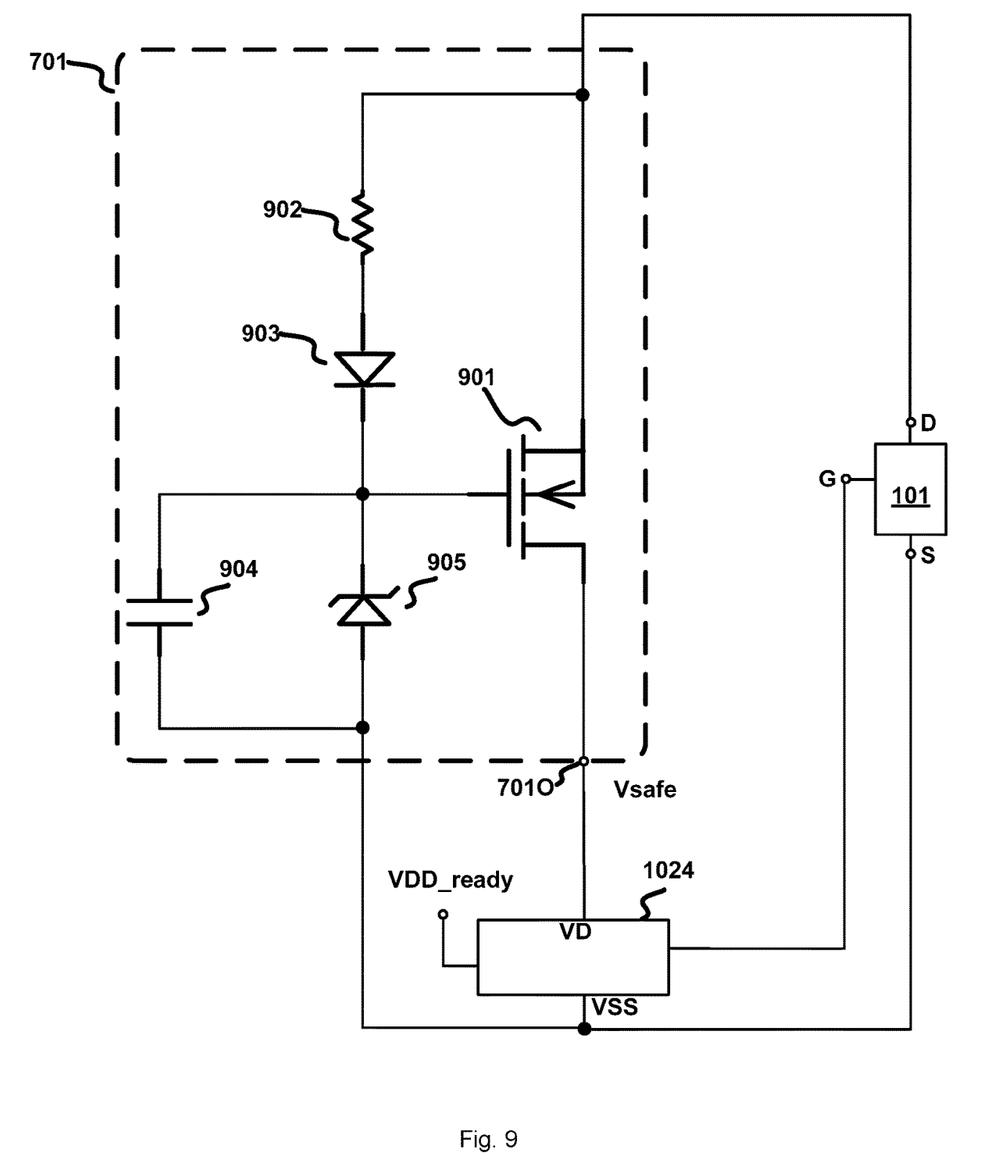
FIG. 9 illustrates a schematic diagram of the driving circuit 102 in accordance with still an alternative embodiment of the present invention.

In an alternative exemplary embodiment as shown in FIG. 9, the high-voltage sustain module 701 may comprise a metal oxide semiconductor field effect transistor ("MOSFET") 901, a resistor 902, a diode 903, a capacitor 904 and a Zener diode 905. In this exemplary embodiment, the breakdown voltage VBV1 of the high-voltage sustain module 701 may refer to the minimum voltage that causes a portion of an insulator in the MOSFET 901 to become electrically conductive or causes a PN junction in the MOSFET 901 to breakdown. The MOSFET 901 may have a drain terminal coupled to the first terminal D of the synchronous rectifier device 101, a source terminal coupled to the first terminal VD of the controllable clamping circuit 1024, and a gate terminal. The resistor 902 may have a first terminal coupled to the first terminal D of the synchronous rectifier 101, and a second terminal coupled to an anode of the diode 903. A cathode of the diode 903 may be coupled to the gate terminal of the MOSFET 901. The capacitor 904 and the Zener diode 905 may be coupled in parallel between the gate terminal of the MOSFET 901 and the second terminal S of the synchronous rectifier 101.

One of ordinary skill in the art should understand that the high-voltage sustain modules 701 shown in FIGS. 8 and 9 are just illustrative and not intended to be limiting. Other suitable circuitry (such as voltage regulators) may be used as the high-voltage sustain module 701.

The advantages of the various embodiments of the present invention are not confined to those described above. These and other advantages of the various embodiments of the present invention will become more apparent upon reading the whole detailed descriptions and studying the various figures of the drawings.

From the foregoing, it will be appreciated that specific embodiments of the present invention have been described herein for purposes of illustration, but that various modifications may be made without deviating from the technology. Many of the elements of one embodiment may be combined with other embodiments in addition to or in lieu of the elements of the other embodiments. Accordingly, the present invention is not limited except as by the appended claims.

What is claimed is:

1. A driving circuit for driving a synchronous rectifier device, comprising:
   a controllable clamping circuit, having a first terminal coupled to a sensing terminal of the driving circuit, a second terminal coupled to a reference ground terminal of the driving circuit, a third terminal coupled to a driving terminal of the driving circuit, and a control terminal configured to receive a supply indication signal indicative of a voltage potential at a supply terminal of the driving circuit; wherein
   the controllable clamping circuit is configured to connect the third terminal of the controllable clamping circuit to the second terminal of the controllable clamping circuit when the supply indication signal indicates that the voltage potential at the supply terminal has not been established; and wherein
   the controllable clamping circuit further comprises:
      a controllable voltage regulation module, comprising: a controllable current source structure, having a supply input terminal coupled to the first terminal of the controllable clamping circuit, a control terminal configured to receive the supply indication signal, and an output terminal, wherein when an output voltage potential at the output terminal of the controllable current source structure is lower than a predetermined voltage and the supply indication signal indicates that the voltage potential at the supply terminal has not been established, the controllable current source structure is configured to provide a current to its output terminal, and wherein when the output voltage potential at the output terminal of the controllable current source structure reaches the predetermined voltage or the supply indication signal indicates that the voltage potential at the supply terminal has been established, the controllable current source structure is further configured to stop providing the current to its output terminal; and a controllable energy storage structure, having a first terminal coupled to the output terminal of the controllable current source structure, a second terminal coupled to the second terminal of the controllable clamping circuit, and a control terminal configured to receive the supply indication signal, wherein when the supply indication signal indicates that the voltage potential at the supply terminal has not been established, the controllable energy storage structure is configured to receive the current from the controllable current source structure and store energy to provide the predetermined voltage at the first terminal of the controllable energy storage structure, and wherein when the supply indication signal indicates that the voltage potential at the supply terminal has been established, the controllable energy storage structure is further configured to release energy.

2. The driving circuit of claim 1, wherein
the controllable clamping circuit is configured to disconnect the third terminal of the controllable clamping circuit from the second terminal of the controllable clamping circuit when the supply indication signal indicates that the voltage potential at the supply terminal has been established.

3. The driving circuit of claim 1, wherein the sensing terminal of the driving circuit is coupled to a first terminal of the synchronous rectifier device, and wherein the reference ground terminal of the driving circuit is coupled to a second terminal of the synchronous rectifier device, and wherein the driving terminal of the driving circuit is coupled to a control terminal of the synchronous rectifier device.

4. The driving circuit of claim 1, wherein the controllable clamping circuit further comprises:
   a controllable clamping switch, having a first terminal coupled to the second terminal of the controllable clamping circuit, a second terminal coupled to the third terminal of the controllable clamping circuit, and a control terminal coupled to the output terminal of the controllable current source structure, wherein the predetermined voltage is higher than a turn-on threshold of the controllable clamping switch.

5. The driving circuit of claim 4, wherein the controllable clamping switch further comprises a switch device of a low rated operating voltage and of a low turn-on threshold.

6. The driving circuit of claim 1, wherein the controllable current source structure further comprises:
   a single direction conductive device, having a first terminal coupled to the supply input terminal of the controllable current source structure, and a second terminal, wherein the single direction conductive device is conductive from the first terminal to the second terminal and is reversely blocked from the second terminal to the first terminal; a first controllable switching device, having a control terminal, a first terminal coupled to the second terminal of the single direction conductive device, and a second terminal coupled to the output terminal of the controllable current source structure;
a second controllable switching device, having a control terminal configured to receive the supply indication signal, a first terminal coupled to the control terminal of the first controllable switching device, and a second terminal coupled to the second terminal of the controllable clamping circuit;
a resistive device, having a first terminal coupled to the supply input terminal of the controllable current source structure, and a second terminal coupled to the control terminal of the first controllable switching device; and
a voltage stabilizer, coupled between the control terminal of the first controllable switching device and the second terminal of the controllable clamping circuit, and is configured to stabilize a voltage at the control terminal of the first controllable switching device at a preset voltage value.

7. The driving circuit of claim 6, wherein the second controllable switching device is turned off when the supply indication signal indicates that the voltage potential at the supply terminal has not been established, and wherein the second controllable switching device is turned on when the supply indication signal indicates that the voltage potential at the supply terminal has been established.

8. The driving circuit of claim 1, wherein the controllable energy storage structure further comprises:
a capacitive energy storage device, having a first terminal coupled to the output terminal of the controllable current source structure, and a second terminal coupled to the second terminal of the controllable clamping circuit; and
an energy storage control switch, having a first terminal coupled to the output terminal of the controllable current source structure, a second terminal coupled to the second terminal of the controllable clamping circuit, and a control terminal configured to receive the supply indication signal.

9. The driving circuit of claim 8, wherein the energy storage control switch is turned off when the supply indication signal indicates that the voltage potential at the supply terminal has not been established, and wherein the energy storage control switch is turned on when the supply indication signal indicates that the voltage potential at the supply terminal has been established.

10. The driving circuit of claim 1, further comprising:
a high-voltage sustain module, coupled between the first terminal of the synchronous rectifier device and the first terminal of the controllable clamping circuit, and configured to clamp a voltage potential at an output terminal of the high-voltage sustain module at a designed safe voltage.

11. The driving circuit of claim 10, wherein the high-voltage sustain module has a breakdown voltage higher than a maximum voltage potential value of the voltage potential at the first terminal of the synchronous rectifier device, and wherein the designed safe voltage is lower than a breakdown voltage of the controllable clamping circuit.

12. The driving circuit of claim 10, wherein the high-voltage sustain module comprises:
a high-voltage junction field effect transistor, having a drain terminal coupled to the first terminal of the synchronous rectifier device, a source terminal coupled to the first terminal of the controllable clamping circuit, and a gate terminal coupled to the second terminal of the synchronous rectifier device.

13. The driving circuit of claim 10, wherein the high-voltage sustain module comprises:
a metal oxide semiconductor field effect transistor ("MOSFET") having a drain terminal coupled to the first terminal of the synchronous rectifier device, a source terminal coupled to the first terminal of the controllable clamping circuit, and a gate terminal;
a resistor having a first terminal coupled to the first terminal of the synchronous rectifier, and a second terminal;
a diode, having an anode coupled to the second terminal of the resistor and a cathode coupled to the gate terminal of the MOSFET; and
a capacitor and a Zener diode coupled in parallel between the gate terminal of the MOSFET and the second terminal of the synchronous rectifier.

14. The driving circuit of claim 10, wherein the high-voltage sustain module comprises a voltage regulator.

15. The driving circuit of claim 1, further comprising:
a voltage regulation circuit, coupled to the supply terminal of the driving circuit and configured to convert the voltage potential at the supply terminal into a power supply potential.

16. The driving circuit of claim 15, further comprising:
a logic control circuit, configured to provide a control signal for controlling on and off switching of the synchronous rectifier device.

17. The driving circuit of claim 16, further comprising:
a driver, configured to enhance a driving capacity of the control signal to provide a driving signal to the driving terminal of the driving circuit.

18. The driving circuit of claim 1, wherein the voltage potential at the supply terminal needs a startup procedure to be charged up to a predetermined supply voltage value.

19. A driving circuit for driving a synchronous rectifier device, comprising:
a controllable current source structure, having a supply input terminal coupled to a sensing terminal of the driving circuit, a control terminal configured to receive a supply indication signal indicative of a voltage potential at a supply terminal of the driving circuit, and an output terminal, wherein when an output voltage potential at the output terminal of the controllable current source structure is lower than a predetermined voltage and the supply indication signal indicates that the voltage potential at the supply terminal has not been established, the controllable current source structure is configured to provide a current to its output terminal, and wherein when the output voltage potential at the output terminal of the controllable current source structure reaches the predetermined voltage or the supply indication signal indicates that the voltage potential at the supply terminal has been established, the controllable current source structure is further configured to stop providing the current to its output terminal;
a controllable energy storage structure, having a first terminal coupled to the output terminal of the controllable current source structure, a second terminal coupled to a reference ground terminal of the driving circuit, and a control terminal configured to receive the supply indication signal, wherein when the supply indication signal indicates that the voltage potential at the supply terminal has not been established, the controllable energy storage structure is configured to receive the current from the controllable current source structure and store energy to provide the predetermined voltage at the first terminal of the controllable energy storage structure, and wherein when the supply indication signal indicates that the voltage potential at the supply terminal has been established, the controllable energy storage structure is further configured to release energy; and a controllable clamping switch, having a first terminal coupled to the reference ground terminal of the driving circuit, a second terminal coupled to a driving terminal of the driving circuit, and a control terminal coupled to the output terminal of the controllable current source structure, wherein the predetermined voltage is higher than a turn-on threshold of the controllable clamping switch.

* * * * *